B. P. SIMONSON.
DROP HITCH WEIGHT.
APPLICATION FILED OCT. 29, 1915.

1,181,179.

Patented May 2, 1916.
2 SHEETS—SHEET 1.

Witness
Frederick L. Fox.

Inventor
B. P. Simonson
By Victor J. Evans.
Attorney

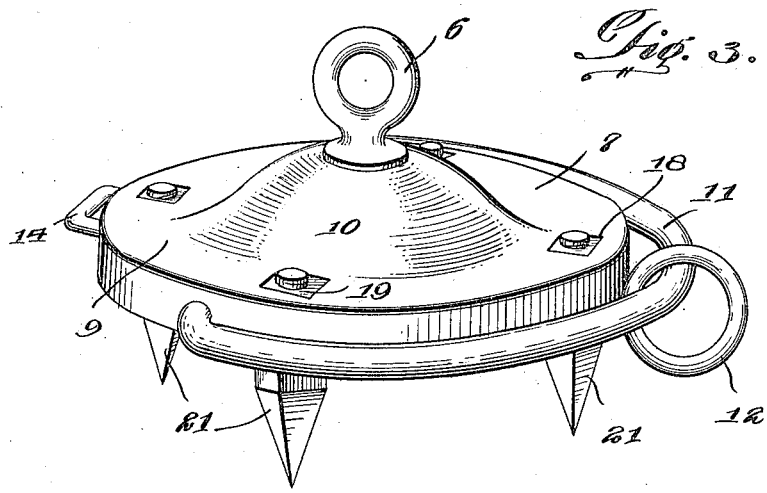
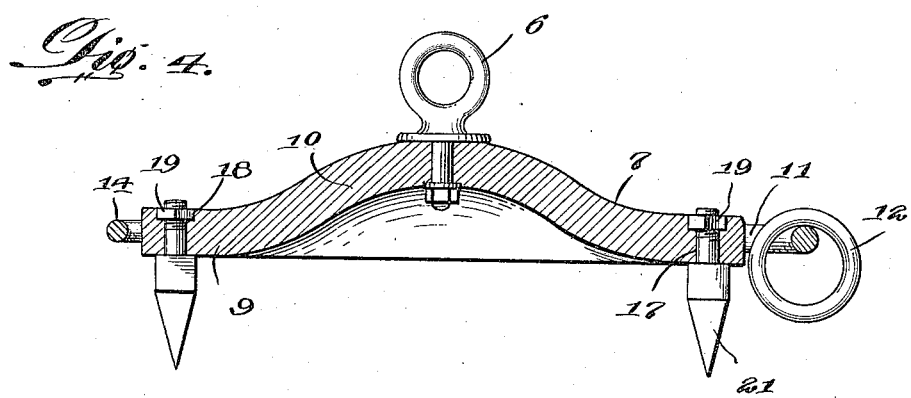
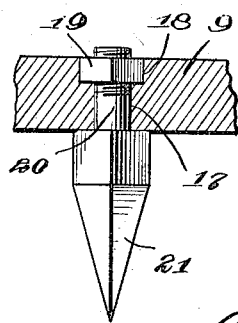

UNITED STATES PATENT OFFICE.

BERNHARDT P. SIMONSON, OF MINNEAPOLIS, MINNESOTA.

DROP HITCH-WEIGHT.

1,181,179. Specification of Letters Patent. Patented May 2, 1916.

Application filed October 29, 1915. Serial No. 58,660.

*To all whom it may concern:*

Be it known that I, BERNHARDT P. SIMONSON, a citizen of the United States, residing at Minneapolis, in the county of Hennepin and State of Minnesota, have invented new and useful Improvements in Drop Hitch-Weights, of which the following is a specification.

The present invention relates to hitching weights for animals, and the object of the invention is to provide a drop hitch weight that is carried by a vehicle and is provided with suitable means for normally retaining the same in raised position upon the vehicle, the said weight being secured to the bridle of the animal by a hitch strap and being connected to the vehicle by a holding strap, so that when the weight is allowed to drop upon the ground a forward movement of the animal will be prevented thereby and the holding strap will drag the weight along with the vehicle should the animal move in a backward direction, so that danger of the animal stepping upon the weight is thus prevented.

A further object of the invention is to provide a weight of a comparatively simple and inexpensive construction, the same being formed or otherwise provided with spurs which are adapted to enter the ground when the weight is in its lowered position, to effectively anchor the same and obviate the liability of the animal running away.

Other objects and advantages will appear as the nature of the invention is more fully understood, reference being had to the accompanying drawings, in which—

Figure 1:
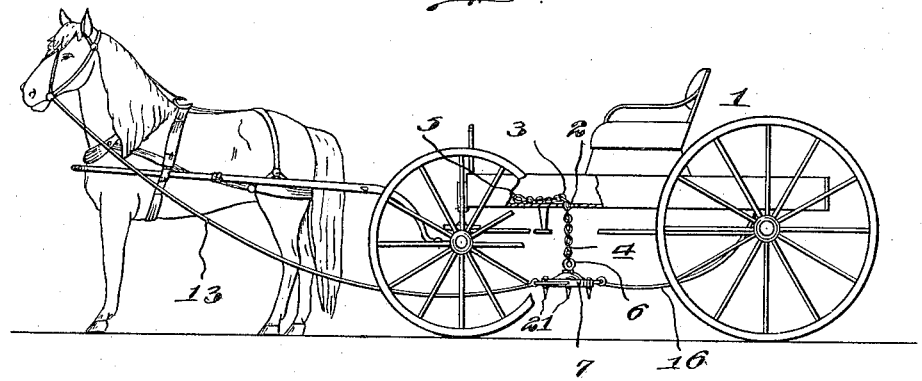
Figure 2:
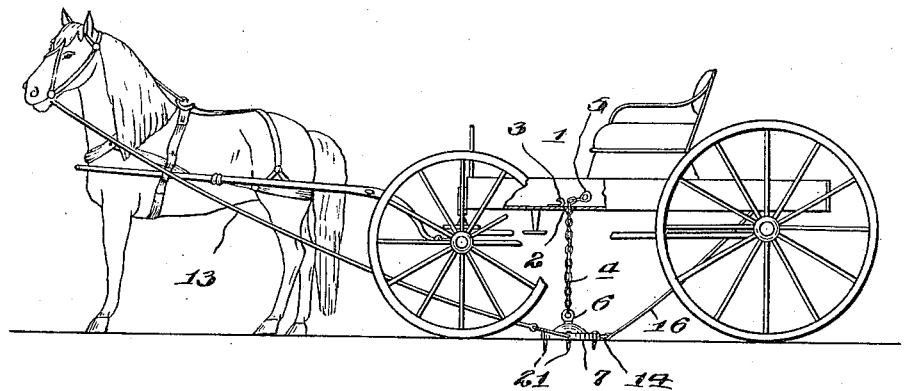

Figure 1 is a sectional elevation illustrating the position of my improvement upon a vehicle, the weight being in its raised position; Fig. 2 is a similar view with the weight in its lowered position; Fig. 3 is a perspective view of the weight; Fig. 4 is a central longitudinal sectional view through the same; Fig. 5 is a detail section illustrating the manner in which the calks are removably retained upon the weight.

Referring now to the drawings in detail, the numeral 1 designates a vehicle to which is hitched a draft animal. The body of the vehicle, at a convenient place thereon, is provided with an opening 2, and arranged adjacent the said opening is a hook 3. Passing through the opening 2 is a flexible element 4 having one of its ends provided with a handle 5, and the flexible element is adapted to be engaged by the hook 3 to retain the same in an elevated position with relation to the body of the vehicle. The flexible element 4 is connected to an eye 6 which is swiveled centrally to the top of my improved weight 7. The weight comprises a flat body 9, having a central dome shaped portion 10.

The weight is provided with a bail member 11 having arranged thereon a ring 12, and this ring is connected with a hitch strap 13 which has its opposite end secured to the bit ring upon the bridle of the animal attached to the vehicle. Formed upon the periphery of the base portion 9 of the weight and opposite the center of the bail 11 is a staple 14, and connected with this staple is a flexible element, in the nature of a strap or chain, 16 which has its free end secured upon the under body of the vehicle to the rear thereof. This is essential, for the reason that should the animal back the vehicle the weight will be moved with the vehicle and danger of the animal treading upon the weight will be thus obviated. The flat surface 9 of the weight is provided with a plurality of openings 17 which enter upon the lower face of said portion 9 and which communicate with substantially rectangular depressions 18. The threaded stems 20 of substantially V-shaped calk members 21 pass through openings 17 and enter the depressions 18. These stems are engaged by nuts 19 which are received in the depressions 18.

From the foregoing description, taken in connection with the accompanying drawings, the construction and operation of my invention may be readily understood without further detailed description and such description has, therefore, been omitted.

Having thus described my invention, I claim:

1. In combination with an animal propelled vehicle, a flexible element passing through an opening in the body of the vehicle, a weight having a swiveled eye connected to the flexible element, a hook for supporting the weight, a flexible connection between the weight and the rear of the vehicle, a bail upon the weight, a ring upon the bail, a hitch strap upon the ring and connected with the bridle bit for the animal, and depending calks for the weight.

2. A hitch weight adapted to be attached to a vehicle and to be dropped therefrom to engage with the road upon which the vehicle travels, said weight comprising a flat disk shaped body having a central raised portion, said raised portion having a central opening, an eye bolt swiveled in the opening, the disk being provided with rounded openings which enter from its lower face and which communicate with rectangular depressions, calk members having central threaded shanks passing through the openings, nuts within the depressions engaging with said shanks, a bail connected at substantially diametrically opposite points to the periphery of the weight and spaced away from said weight, a ring upon the bail, a staple member upon the periphery of the weight disposed approximately diametrically opposite the center of the bail.

In testimony whereof I affix my signature in presence of two witnesses.

BERNHARDT P. SIMONSON.

Witnesses:
H. R. LEIGHTON,
M. R. HANDBERG.

Copies of this patent may be obtained for five cents each, by addressing the "Commissioner of Patents, Washington, D. C."